United States Patent
Hede et al.

(10) Patent No.: US 6,802,109 B2
(45) Date of Patent: Oct. 12, 2004

(54) SELF-LOCKING FIXING LOOP WITH STRAP ADJUSTMENT

(75) Inventors: Jean-Marc Hede, Domene (FR); Paul Petzl, Barraux (FR)

(73) Assignee: Zedel, Crolles (FR)

( * ) Notice: Subject to any disclaimer, the term of this patent is extended or adjusted under 35 U.S.C. 154(b) by 0 days.

(21) Appl. No.: 10/467,715

(22) PCT Filed: Jan. 17, 2003

(86) PCT No.: PCT/FR03/00146

§ 371 (c)(1),
(2), (4) Date: Aug. 12, 2003

(87) PCT Pub. No.: WO03/059107

PCT Pub. Date: Jul. 24, 2003

(65) Prior Publication Data

US 2004/0078943 A1 Apr. 29, 2004

(30) Foreign Application Priority Data

Jan. 18, 2002 (FR) .......................... 02 00593

(51) Int. Cl.⁷ ............................................. A44B 11/25
(52) U.S. Cl. .......................... 24/318; 24/165; 24/195; 24/599.5; 24/600.1; 24/265 H
(58) Field of Search ............................. 24/599.4, 599.5, 24/599.6–600.2, 195, 265 H, 165, 185, 187, 189, 192, 199, 318, 321, 319

(56) References Cited

U.S. PATENT DOCUMENTS

| | | | | | |
|---|---|---|---|---|---|
| 263,176 | A | * | 8/1882 | Hawes | 24/134 R |
| 292,164 | A | * | 1/1884 | Gibbons | 24/599.7 |
| 372,821 | A | * | 11/1887 | Spooner | 24/185 |
| 429,137 | A | * | 6/1890 | Loveless | 24/185 |
| 536,390 | A | * | 3/1895 | Parker | 24/185 |
| 889,013 | A | * | 5/1908 | Hutchison | 24/165 |
| 2,498,334 | A | * | 2/1950 | Garner | 24/165 |
| 2,514,656 | A | * | 7/1950 | Manson | 24/599.5 |
| 3,992,756 | A | | 11/1976 | Stafstrom | |
| 4,074,401 | A | | 2/1978 | Spinosa et al. | |
| 4,928,360 | A | | 5/1990 | Wilbanks | |
| 6,023,820 | A | | 2/2000 | Fair | |

FOREIGN PATENT DOCUMENTS

CH 674 302 A5 5/1990

* cited by examiner

Primary Examiner—James R. Brittain
(74) Attorney, Agent, or Firm—Oliff & Berridge, PLC

(57) ABSTRACT

A self-locking fixing loop with adjustment of an attachment strap comprises a base equipped with a clasp for hooking a retaining ring thereon, and an operating button movable between a closed position and an open position of the loop, respectively to hold and release said retaining ring. A spring locks the operating button in the closed position, and a ring adjusts the length of the strap, said ring being inserted between the button and the base opposite the clasp.

6 Claims, 7 Drawing Sheets

SELF-LOCKING FIXING LOOP WITH STRAP ADJUSTMENT

BACKGROUND OF THE INVENTION

The invention relates to a self-locking fixing loop comprising a base equipped with a clasp for hooking a retaining ring thereon, and an operating button movable between a closed position and an open position of the loop, respectively to hold and release said retaining ring.

The fixing loop can for example equip a strap of a belt or of a body harness for climbing or pot-holing. It is imperative for handling reasons for opening of the loop to take place without having to remove the strap, the latter having in addition to be adjustable. Moreover, for questions of safety, unscheduled opening of the loop must not be able to take place.

OBJECT OF THE INVENTION

The object of the invention is to achieve a fixing loop preventing any unscheduled opening and not requiring the strap to be removed when deliberate opening is performed.

The loop according to the invention is characterized in that it comprises:

- a locking means for locking the operating button in the closed position,
- and an adjustment ring for adjusting the length of the strap, said ring being inserted between the button and the base opposite the clasp.

According to a preferred embodiment, the locking means comprises a catch arranged as a rocker pivotally mounted on a spindle between a locked position and an unlocked position, and a return spring urging automatic resetting of said catch in the locked position to prevent the operating button from moving to the open position. The base comprises a flange arranged as a support for articulation of the operating button, and a first hole for insertion of a lug of the button when movement takes place to the open position.

The base is equipped with a second hole situated under the adjustment ring for passage of the strap. The retaining ring is provided with a pin designed to enter a hole of the clasp to limit the angular movement of the retaining ring under a strong load.

According to an alternative embodiment, the locking means is formed by a compression spring pressing on the base and urging the button to the closed position.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF AN EMBODIMENT OF THE LOOP

Figure 1:
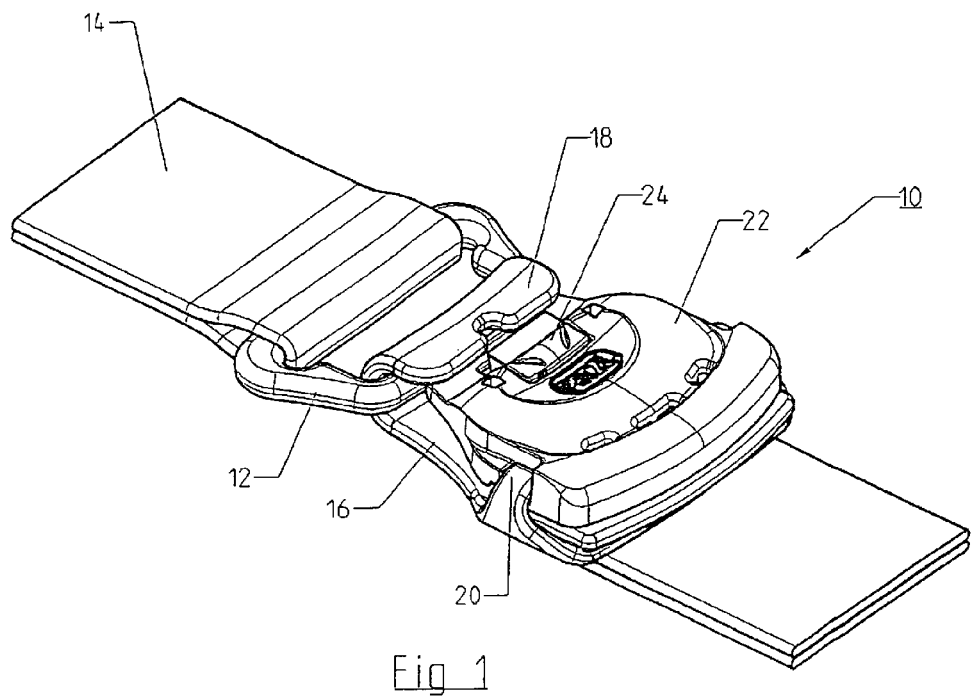
FIGS. 1 and 2 are perspective views of the whole of the loop according to the invention respectively in the closed position and in the open position.

In FIGS. 1 to 8, a fixing loop 10 is designed to receive a retaining ring 12 whereto the end of an attachment strap 14, for example of a belt or a harness, is securedly attached. The other end of the strap is attached to the loop 10.

The fixing loop 10 comprises a metal base 16 in the form of a clasp 18 at the front part, and a flange 20 at the rear part. The clasp 18 cooperates by hooking up with the ring 12 when the fixing loop 10 is closed, whereas the flange 20 acts as support for articulation of an operating button 22. The latter is pivotally mounted between a closed position to hold the ring 12 captive inside the clasp 18 and an open position for formation of a gap releasing the ring 12. The button 22 can be made of plastic or metal.

Figure 7:
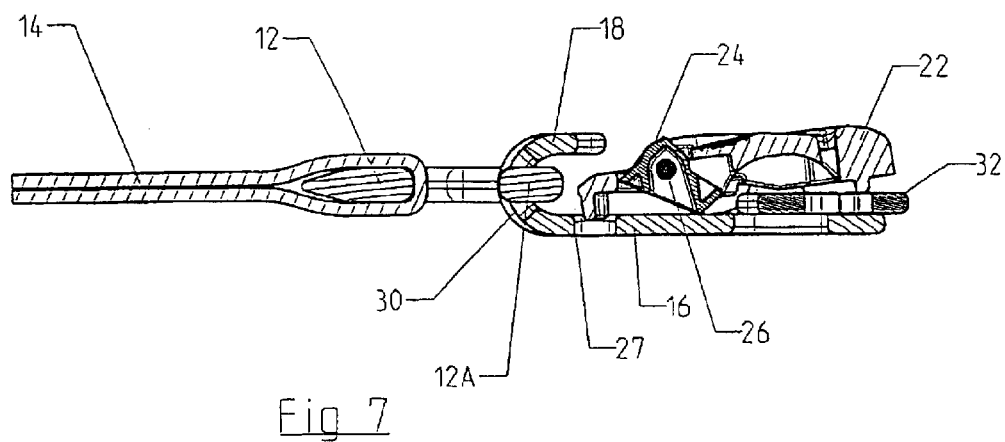
FIGS. 7 and 8 are identical views to FIG. 5 of the loop, respectively during opening and at the end of opening travel.
Figure 8:
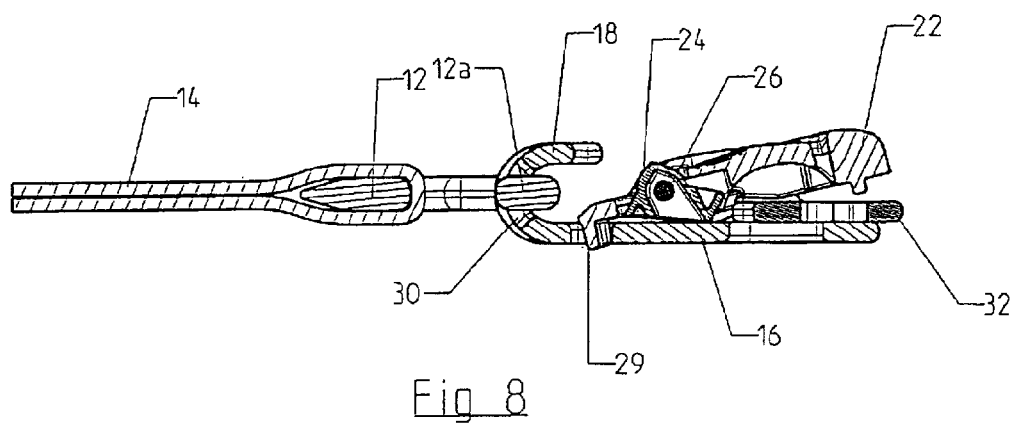

A rotary or swivelling catch 24 is associated with the button 22 to prevent unscheduled movement of the latter to the open position. The catch 24 can pivot for this purpose around a spindle 26 between a locked position and an unlocked position. A return spring 28 (FIG. 5A), for example a torsion spring, is wound on the spindle 26 and urges the catch 24 clockwise to the locked position. In the unlocked position, a lug 29 of the button 22 can enter a first hole 27 of the base 16 to allow the ring 12 to be unhooked. To push the button 22 downwards in the opening direction of the loop 10, the rocking catch 24 first has to be turned to the unlocked position against the return force of the spring 28 (FIGS. 7 and 8).

The ring 12 is equipped in the central part with a pin 12a designed to enter an axial hole 30 of the clasp 18 so as to limit the angular movement of the ring 12 under load in a wrong direction (FIG. 4), and to prevent any engagement against the button 22 liable to unlock the rotary catch 24.

Figure 4:
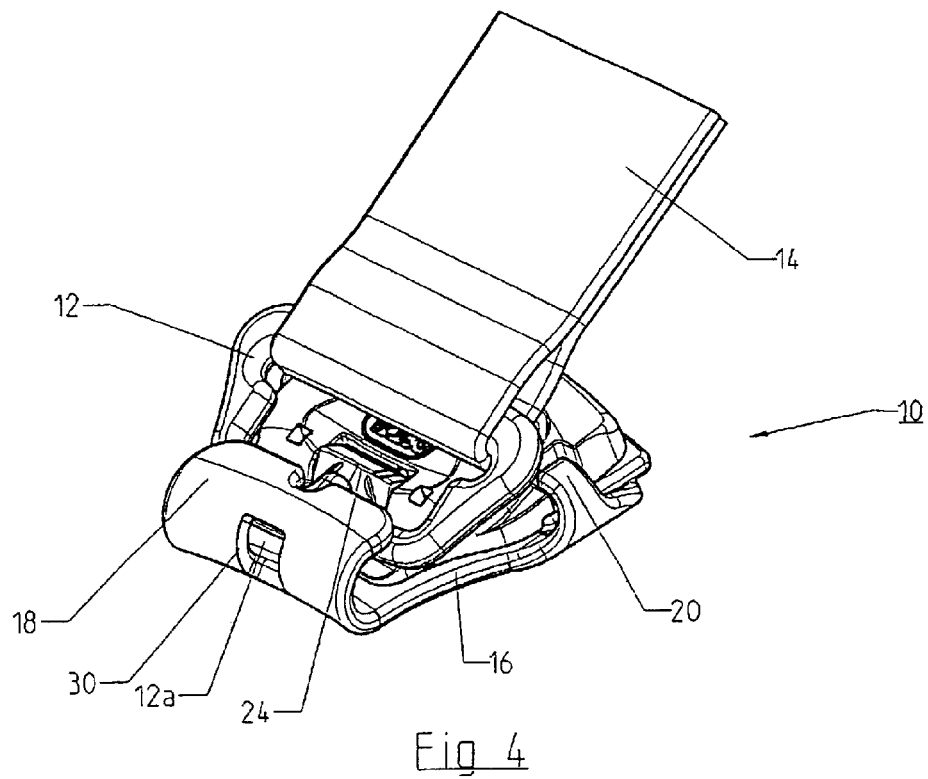
FIG. 4 is an identical view to FIG. 3 after the ring has swivelled towards the button.
Figure 4A:
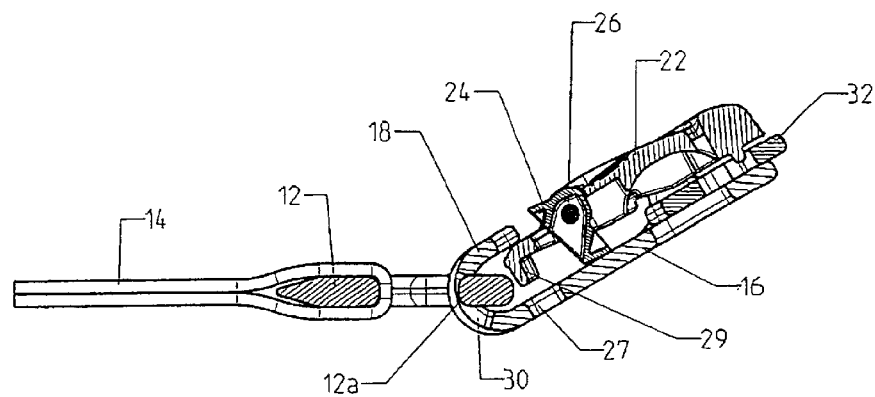
FIGS. 4A and 5 represent longitudinal sectional views of the loop in the closed position and for two different inclines.
Figure 5:
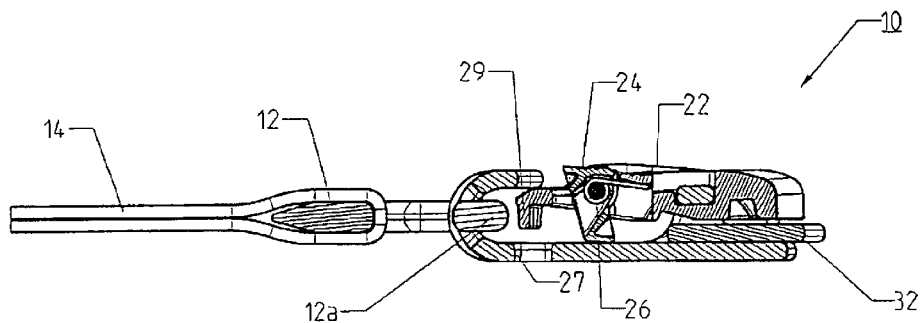

The lug 29 also serves the purpose of preventing movement of the ring 12 to the right when the button 22 is in the closed position. The pin 12a then remains held in the hole 30 (FIGS. 4A and 5).

Figure 9:
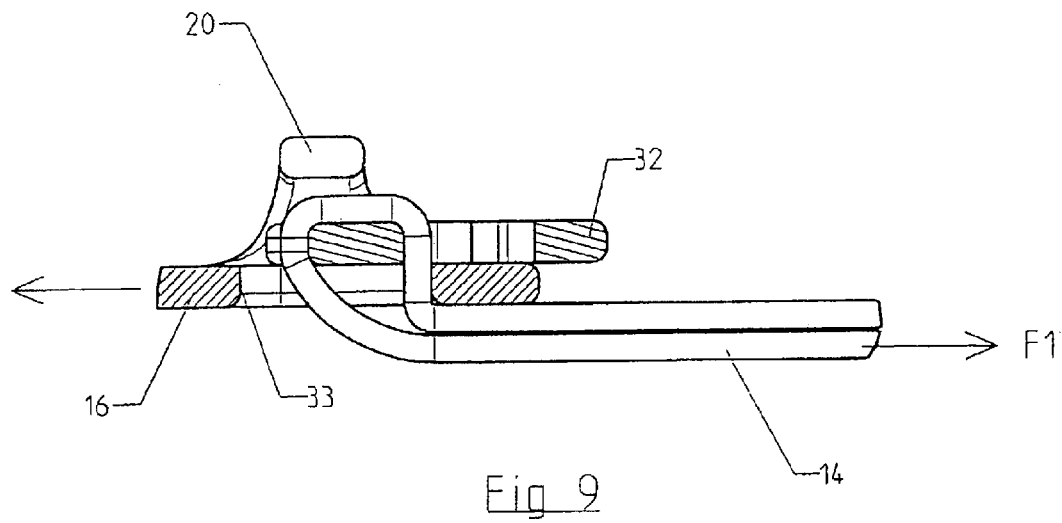
FIGS. 9 to 11 illustrate the different phases of adjustment of the strap.
Figure 10:
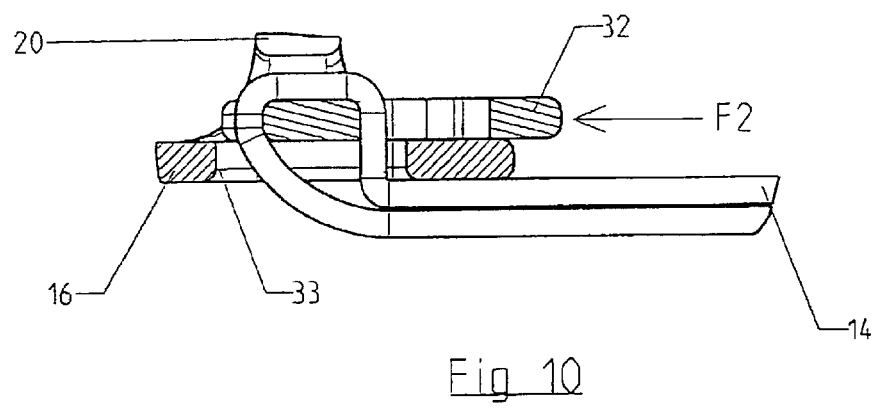
Figure 11:
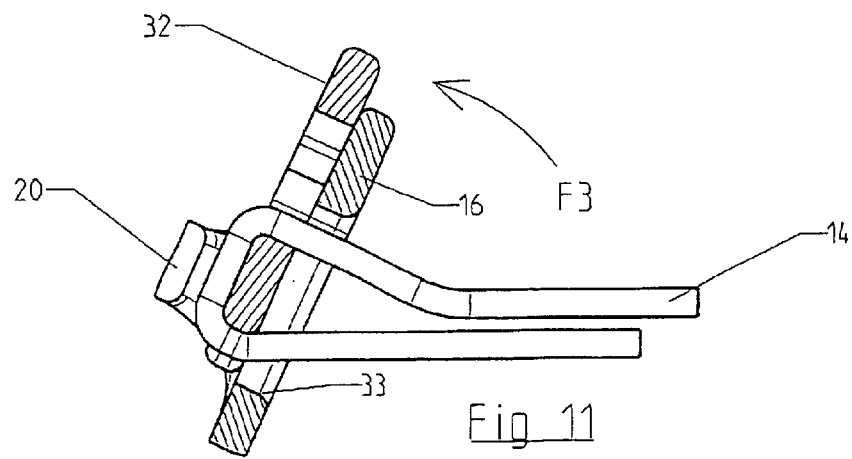

With reference to FIGS. 9 to 11, the end of the strap 14 situated on the same side as the loop 10 is adjustable in length by means of an adjustment ring 32 integrated in the loop 10 opposite the clasp 18. Any force exerted on the strap 14 in the direction of the arrow F1 causes movement of the adjustment ring 32 in the same direction, so as to block the strap 14 (FIG. 9). The base 16 is provided with a second hole 33 for passage of the strap 14.

To unwedge the strap 14, the adjustment ring 32 simply has to be pushed in the direction of the arrow F2 (FIG. 10) or the loop 10 be swivelled in the direction of the arrow F3 (FIG. 11). Adjustment can then be performed by pulling on one of the strands of the strap 14.

Figure 12A:
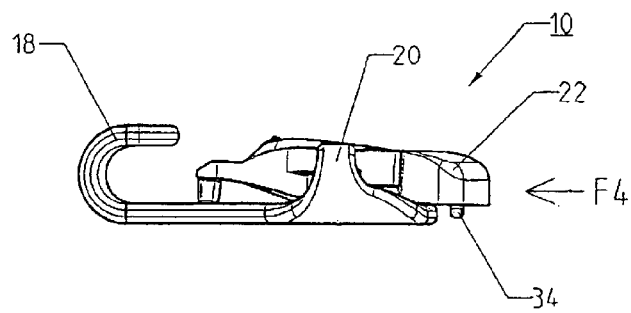
FIGS. 12A–12E represent the different phases of fitting and assembly of the loop.

The different phases of fitting of the loop 10 are illustrated in FIGS. 12A to 12E. After the catch 24 has been assembled on the button 22, the latter is slid in the direction of the arrow F4 under the two articulation lugs of the flange 20 (FIG. 12A).

Figure 12B:
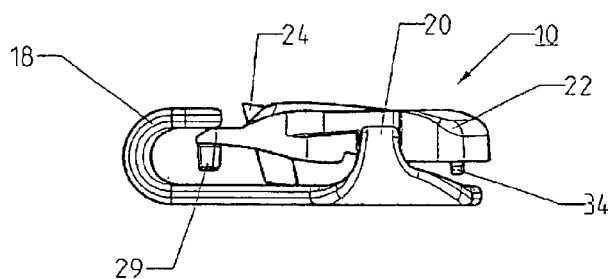

In FIG. 12B, the button 22 moves up into its housing and is ready to swivel. It presents at the rear a retaining spigot 34 designed to keep the adjustment ring 32 in place.

Figure 12C:
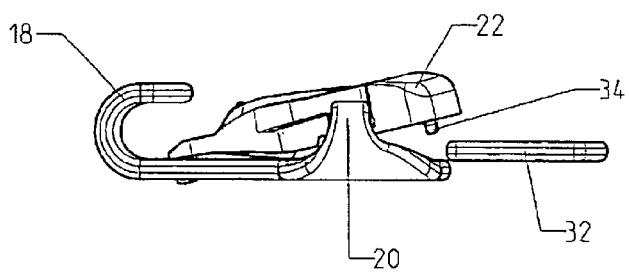

In FIG. 12C, the adjustment ring 32 is inserted in the loop 10 at the rear of the flange 20. Frontwards swivelling of the button 22 causes the spigot 34 to lift to allow the longitudinal sliding movement of the adjustment ring 32.

Figure 12D:
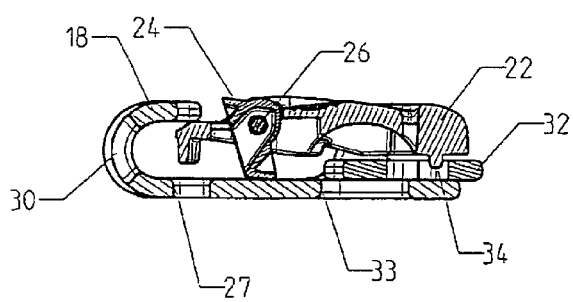

FIG. 12D shows the loop 10 in a pre-assembly state in which it can be manipulated. The retaining spigot 34 is housed in the hole of the adjustment ring 32 and prevents the latter from egressing therefrom keeping it in contact with the internal face of the base 16.

Figure 12E:
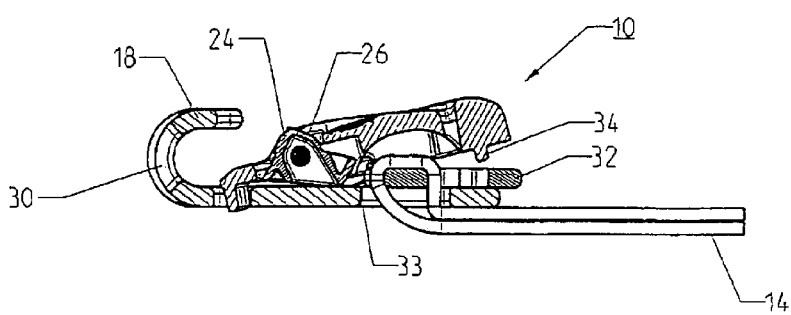

In FIG. 12E, inserting the strap 14 via the hole 33 secures the adjustment ring 32, which securedly affixes the button 22 in the flange 20. Such an assembly of the loop 10 is performed without any tools and is rendered unable to be dissasembled once the strap 14 has been inserted.

Figure 5A:
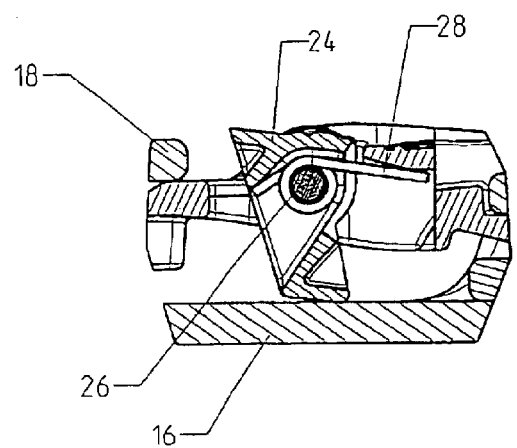
FIG. 5A illustrates an enlarged scale sectional view of the catch of FIG. 5.

Operation of the fixing loop 10 is as follows:

In FIGS. 1, 5 and 5A, the loop 10 is in the closed position and the button 22 is blocked by the catch 24 in the locked position by the spring 28. The retaining ring 12 is positively secured in the clasp 18 of the base 16.

Figure 6:
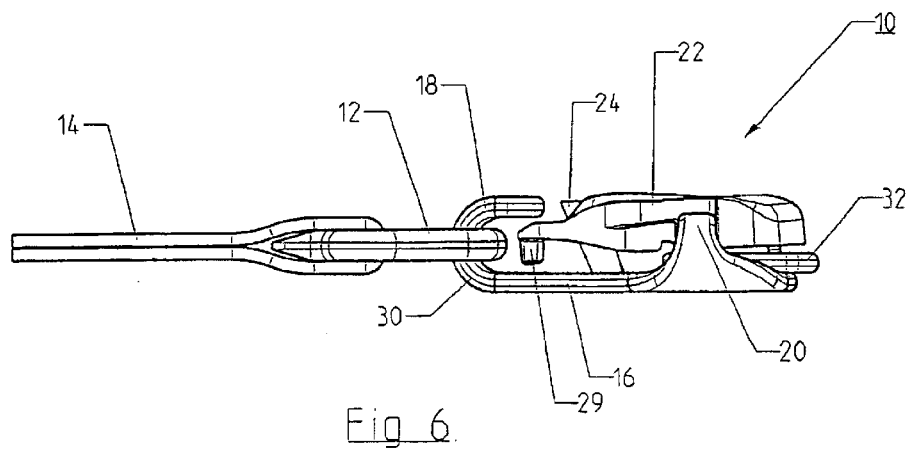
FIG. 6 is an elevational view of the loop according to FIG. 5.

In FIG. 6, any deliberate attempt to press on the button 22 does not enable opening thereof so long as the catch 24 remains in the locked position, i.e. pressing on the base 16. Unscheduled opening of the loop 10 is thus rendered impossible.

An opening command requires two distinct consecutive actions to be performed:

a first action of unlocking the catch 24 and pressing on the button 22 to open the loop 10;

a second action to unhook the ring 12 from the clasp 18, moving it in the opposite direction to that of the tension of the strap 14.

The first manual action of the unlocking action is represented in FIGS. 7 to 8.

In FIG. 7, after clockwise rotation of the catch 24, the contact point of the catch 24 on the base 16 is located to the rear of the spindle 26 allowing the cover 22 to swivel in the same direction.

In FIG. 8, the catch 24 is in the unlocked position enabling the loop 10 to be completely opened.

Figure 2:
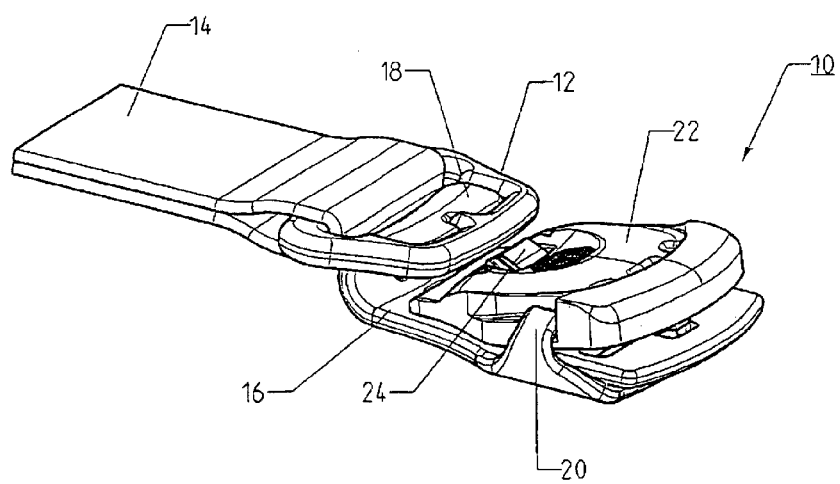
Figure 3:
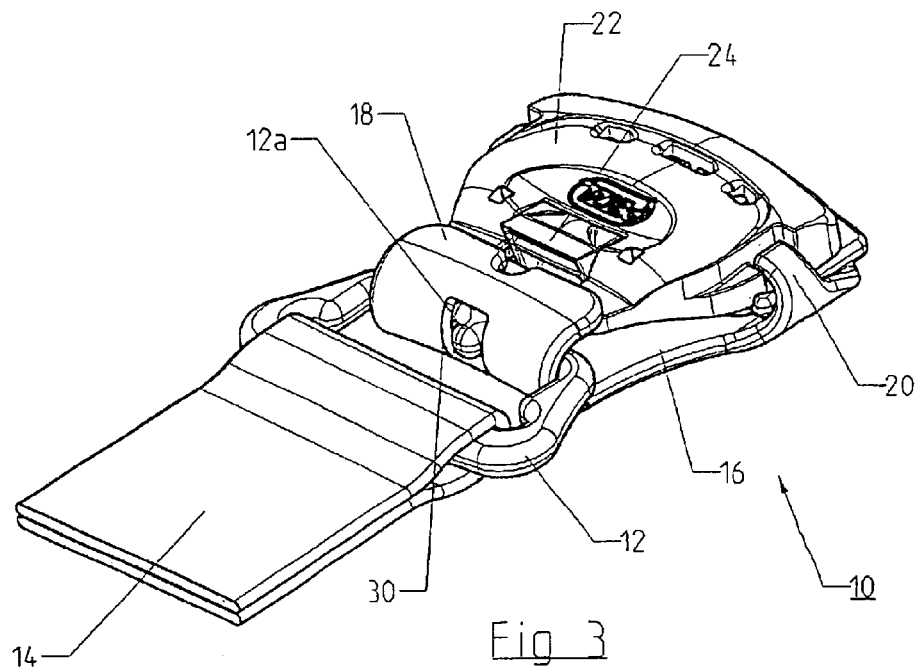
FIG. 3 shows the loop of FIG. 1 from another angle.

The retaining ring 12 can now be unhooked from the clasp 18, as indicated in FIG. 2.

Releasing the button 22 performs automatic resetting of the catch 24 and returns the button 22 to the position of FIG. 5.

Figure 13:
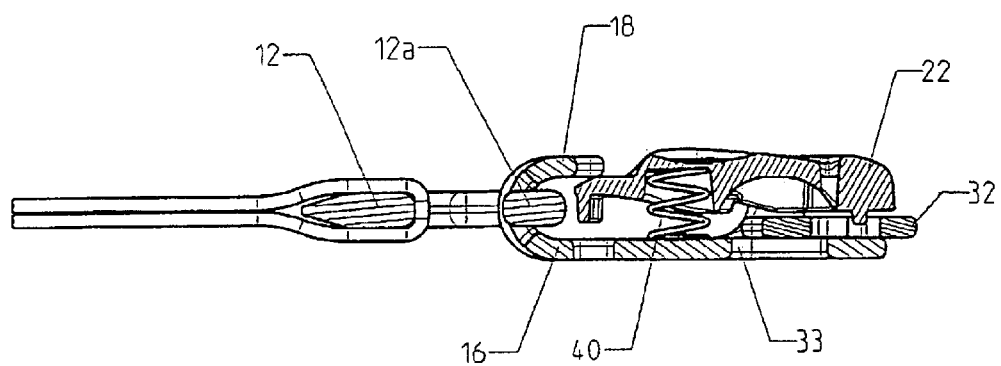
FIG. 13 is an identical view to FIG. 5 of an alternative embodiment.

According to an alternative embodiment illustrated in FIG. 13, the catch 24 is replaced by a compression spring 40 fitted between the button 22 and the base 16.

To obtain opening of the loop, the button 22 simply has to be pressed to allow the retaining ring 12 to be unhooked.

What is claimed is:

1. A self-locking fixing loop, comprising:

a base equipped with a clasp for hooking a retaining ring thereon, an operating button movable between a closed position and an open position of the loop, respectively to hold and release said retaining ring, locking means comprising a catch arranged as a rocker pivotally mounted on a spindle between an unlocked position and a locked position for locking the operating button in the closed position, and a movable adjustment ring for adjusting a length of a strap, said ring being inserted between the button and the base opposite the clasp, wherein the operating button is equipped with a spigot designed to keep the adjustment ring in place when the button is in the closed position.

2. The fixing loop according to claim 1, wherein a return spring ensures an automatic resetting of said catch in the locked position to prevent the operating button from moving to the open position.

3. The fixing loop according to claim 1, wherein the base comprises a flange arranged as a support for articulation of the operating button, and a first hole for insertion of a lug of the button when movement takes place to the open position.

4. The fixing loop according to claim 2, wherein the return spring is formed by a torsion spring wound on the spindle of the catch.

5. The fixing loop according to claim 1, wherein the retaining ring is provided with a pin designed to enter a hole of the clasp to limit an angular movement of the retaining ring under a strong load.

6. The fixing loop according to claim 1, wherein the base is provided with a first hole situated under the adjustment ring for passage of the strap.

* * * * *